(12) United States Patent
Roberts et al.

(10) Patent No.: US 8,432,084 B2
(45) Date of Patent: Apr. 30, 2013

(54) CONVERTING MECHANICAL VIBRATIONAL ENERGY INTO ELECTRICAL ENERGY

(75) Inventors: Stephen Roberts, Winchester (GB); Roy Freeland, Shawford (GB)

(73) Assignee: Perpetuum Ltd., Southampton (GB)

( * ) Notice: Subject to any disclaimer, the term of this patent is extended or adjusted under 35 U.S.C. 154(b) by 855 days.

(21) Appl. No.: 11/911,064

(22) PCT Filed: Apr. 11, 2006

(86) PCT No.: PCT/GB2006/001304
§ 371 (c)(1),
(2), (4) Date: Mar. 11, 2009

(87) PCT Pub. No.: WO2006/109037
PCT Pub. Date: Oct. 19, 2006

(65) Prior Publication Data
US 2010/0033142 A1    Feb. 11, 2010

(30) Foreign Application Priority Data
Apr. 12, 2005   (GB) .................................. 0507390.3

(51) Int. Cl.
*H01L 41/00*   (2006.01)
*H02N 2/00*    (2006.01)
(52) U.S. Cl.
USPC ............. 310/321; 310/316.01; 290/1 R
(58) Field of Classification Search ................. 290/1 R; 310/321, 316.01, 339, 319, 325; 322/40; 180/166
See application file for complete search history.

(56) References Cited

U.S. PATENT DOCUMENTS

| | | | | |
|---|---|---|---|---|
| 4,554,477 A * | 11/1985 | Ratcliff | ................ | 310/316.01 |
| 4,919,500 A * | 4/1990 | Paulsen | ................ | 359/214.1 |
| 5,578,877 A | 11/1996 | Tiemann et al. | | |
| 5,654,605 A * | 8/1997 | Kawashima | ............ | 310/316.01 |
| 5,986,369 A * | 11/1999 | Hanley et al. | ................ | 310/77 |
| 6,268,681 B1 * | 7/2001 | Yamaguchi et al. | ...... | 310/316.01 |
| 6,661,154 B2 * | 12/2003 | Shibatani | ................ | 310/316.01 |
| 6,995,496 B1 * | 2/2006 | Hagood et al. | ................ | 310/317 |

(Continued)

FOREIGN PATENT DOCUMENTS

| | | | |
|---|---|---|---|
| GB | 2064883 A | 6/1981 | |
| JP | 1086726 A | 3/1980 | |

(Continued)

OTHER PUBLICATIONS

English translation of portions of Japanese Office Action in corresponding case JP 2008-505951 mailed Dec. 2, 2011, along with English translation of portions of the art cited in this office action (JP2005-57820A and JP10-86726A) 7 pages.

*Primary Examiner* — Julio C. Gonzalez R.
(74) *Attorney, Agent, or Firm* — Colin P. Cahoon; Amanda K. Jenkins; Carstens & Cahoon, LLP

(57) ABSTRACT

An electromechanical generator comprising an electromechanical device for converting mechanical vibrational energy into electrical energy, the electromechanical device being a velocity damped resonator having a damping coefficient and a resonant frequency, a power detector for detecting the output electrical power from the electromechanical device, a controller, and a damping coefficient adjuster for adjusting the damping coefficient of the electromechanical device, the controller being arranged to control the damping coefficient adjuster in response to the output electrical power detected by the power detector.

23 Claims, 5 Drawing Sheets

U.S. PATENT DOCUMENTS

| | | | |
|---|---|---|---|
| 7,471,029 B2 * | 12/2008 | Ha et al. | 310/316.01 |
| 7,747,355 B2 * | 6/2010 | Bulthaup et al. | 700/287 |
| 7,795,780 B2 * | 9/2010 | Denier et al. | 310/318 |
| 2002/0036444 A1 * | 3/2002 | Yamashiro et al. | 310/316.01 |
| 2004/0041315 A1 | 3/2004 | Noe | |
| 2006/0119102 A1 * | 6/2006 | Hershey et al. | 290/1 R |
| 2007/0103032 A1 * | 5/2007 | Yamashita | 310/316.01 |

FOREIGN PATENT DOCUMENTS

| | | | |
|---|---|---|---|
| JP | 06070560 A | * | 3/1994 |
| JP | 2002128260 A | | 5/2002 |
| JP | 200557820 A | | 3/2005 |
| WO | 2005/022726 A | | 3/2005 |

* cited by examiner

CONVERTING MECHANICAL VIBRATIONAL ENERGY INTO ELECTRICAL ENERGY

FIELD OF THE INVENTION

The present invention relates to an electromechanical generator for converting mechanical vibrational energy into electrical energy and to a method of converting mechanical vibrational energy into electrical energy. In particular, the present invention relates to such a device which is a miniature generator capable of converting ambient vibration energy into electrical energy for use, for example, in powering intelligent sensor systems. Such a system can be used in inaccessible areas where wires cannot be practically attached to provide power or transmit sensor data.

BACKGROUND OF THE INVENTION

There is currently an increasing level of research activity in the area of alternative power sources for micro electrical mechanical systems (MEMS) devices, such devices being described in the art as being used for 'energy harvesting' and as 'parasitic power sources'. Such power sources are currently being investigated for powering wireless sensors.

It is known to use an electromechanical generator for harvesting useful electrical power from ambient vibrations. A typical magnet-coil generator consists of a spring-mass combination attached to a magnet or coil in such a manner that when the system vibrates, a coil cuts through the flux formed by a magnetic core. The mass which is moved when vibrated is mounted on a cantilever beam. The beam can either be connected to the magnetic core, with the coil fixed relative to an enclosure for the device, or vice versa.

For example, WO-A-2005/022726 discloses an electromechanical generator for harvesting useful electrical power from ambient vibrations having various coil/magnet configurations, in particular incorporated into a multilayer device.

In a paper entitled "Architecture for vibration-driven micropower generators", by Mitcheson et al, published in the Journal of Micromechanical Systems, Vol. 13, No. 3, June 2004, pp. 335-342, various electromechanical generators are disclosed. In particular, a velocity-damped resonant generator (VDRG) is disclosed which consists of a damper for extracting energy from a mass-spring system. Such a damper may consist, for example, of a magnet-coil generator, such as the combination of two magnets mounted on a keeper to form a C-shaped core with a coil placed in the air-gap between the magnets at right angles to the direction of movement of the mass on a cantilever beam.

The authors identify a damping factor for determining the maximum power obtainable from the velocity-damped resonant generator. In particular, the authors provide a calculation for the optimal damping factor at which maximum power is obtained. The optimal damping factor is calculated using the resonant frequency of the velocity-damped resonant generator.

While this prior disclosure produced a useful mechanism for designing a theoretical electromechanical generator, when an electromechanical generator is used in a practical application, it is not possible accurately to predict the resonant frequency or the optimal damping factor. The electromechanical generator is designed and set up for what is believed to be the likely operating conditions. However, there is no guarantee that the practical operating conditions correspond to the theoretical ideal used to set up the electromechanical generator for the specific application. In practice, an electromechanical generator is set up to be operable across a narrow range of likely operating conditions, in particular with the damping factor being set up so that the power output is within a range encompassing the optimal power output. However, it is very unlikely that the actual power output is optimised for the specific application. Consequently, the electromechanical generator would not operate at maximum efficiency of the conversion of mechanical vibration energy into electrical energy, and thereby into useful electrical power.

Also, the frequency of ambient vibration may change during operation. The known electromechanical generator may not be able to operate at maximum efficiency as a result of such a change.

In a different art, US-A-2004/0041315 discloses a vibration damping device, incorporating an energy converter in conjunction with a mass-spring damper system, for particular use in aircraft, such as a helicopter. A control circuit can vary the damping between two extremes. Using a flight computer, the control circuit takes up a first control value when the aircraft is in steady flight and a second control value when the aircraft is in a heading-changing state. This disclosure does not relate to electromechanical generators for harvesting useful electrical power from ambient vibrations.

Accordingly, there is still a need to enhance the efficiency of the conversion of mechanical vibration energy into electrical energy, and thereby into useful electrical power.

SUMMARY OF THE INVENTION

The present invention aims to provide an improved electromechanical generator for converting mechanical vibrational energy into electrical energy which can operate more efficiently than known devices in practical use.

The present invention also aims to provide an improved method for operating an electromechanical generator for converting mechanical vibrational energy into electrical energy which can provide more efficient energy conversion than the use of known devices in practical use.

The present invention accordingly provides an electromechanical generator comprising an electromechanical device for converting mechanical vibrational energy into electrical energy, the electromechanical device being a velocity damped resonator having a damping coefficient and a resonant frequency, a power detector for detecting the output electrical power from the electromechanical device, a controller, and a damping coefficient adjuster for adjusting the damping coefficient of the electromechanical device, the controller being arranged to control the damping coefficient adjuster in response to the output electrical power detected by the power detector.

Preferably, the damping coefficient adjuster is preset to default to a preset first damping coefficient.

More preferably, the damping coefficient adjuster is preset to default to the preset first damping coefficient upon detection of output electrical power above a preset threshold value by the power detector.

Preferably, the damping coefficient adjuster is adapted to reduce the damping coefficient from the preset first damping coefficient under control of the controller after the power detector has detected a maximum power output at a resonant frequency.

Optionally, the damping coefficient adjuster is preset to default to a preset second damping coefficient, higher than the first damping coefficient, in the absence of the detection of output electrical power above a preset threshold value by the power detector.

In the preferred embodiment, the electromechanical generator further comprises a resonant frequency adjuster for adjusting the resonant frequency of the electromechanical device, the controller being arranged to control the resonant frequency adjuster in response to the output electrical power detected by the power detector.

Preferably, the resonant frequency adjuster is preset to default to a preset first frequency.

More preferably, the resonant frequency adjuster is preset to default to the preset first frequency upon detection of output electrical power above a preset threshold value by the power detector.

Preferably, the resonant frequency adjuster is adapted to change the frequency from the preset first frequency under control of the controller at a particular damping coefficient, the frequency being changed until a maximum power output has been detected by the power detector.

The frequency is typically increased, but it may be reduced in some applications.

Optionally, the resonant frequency adjuster is preset to default to a preset second frequency, different from the first frequency, in the absence of the detection of output electrical power above a preset threshold value by the power detector.

Typically, the preset second frequency is higher than the preset first frequency.

Preferably, the resonator of the electromechanical device has a spring constant and the resonant frequency adjuster is adapted to control the resonant frequency by adjusting the spring constant.

The electromechanical generator may further comprise a power circuit, driven by the output electrical power, for driving the controller.

The electromechanical generator may further comprise a comparator in the controller for determining the maximum output power from the electromechanical device.

Preferably, the controller is adapted periodically to control the damping coefficient adjuster.

Preferably, the controller is adapted periodically also to control the resonant frequency adjuster.

More preferably, the controller is adapted periodically to control the resonant frequency adjuster to accommodate any changes in ambient frequency of vibration of the electromechanical generator.

The electromechanical device may be adapted to convert mechanical power to electrical power via an electromagnetic coupling or via a piezoelectric coupling.

The present invention further provides a method of converting mechanical vibrational energy into electrical energy using an electromechanical generator, the method comprising the steps of: providing an electromechanical device comprising a velocity damped resonator having a damping coefficient and a resonant frequency; vibrating the electromechanical device; detecting the output electrical power from the electromechanical device; and adjusting the damping coefficient of the electromechanical device in response to the detected output electrical power.

The method may further comprise the step of presetting the damping coefficient to a preset first damping coefficient.

Preferably, the damping coefficient is preset to the preset first damping coefficient upon detection of output electrical power above a preset threshold value.

The method may further comprise the step of reducing the damping coefficient from the preset first damping coefficient after detection of a maximum power output at a resonant frequency.

The method may further comprise the step of presetting the damping coefficient to preset second damping coefficient, higher than the first damping coefficient, in the absence of the detection of output electrical power above a preset threshold value.

The method may further comprise the step of adjusting the resonant frequency of the electromechanical device in response to the detected output electrical power.

The method may further comprise the step of presetting the resonant frequency to a first frequency.

Preferably, the resonant frequency is preset to the first frequency upon detection of output electrical power above a preset threshold value.

Preferably, the frequency is changed from the preset first frequency at a particular damping coefficient, the frequency being changed until a maximum power output has been detected.

The frequency is typically increased, but it may be reduced in some applications.

Preferably, the resonant frequency is preset to a preset second frequency, different from the first frequency, in the absence of the detection of output electrical power above a preset threshold value.

Typically, the preset second frequency is higher than the preset first frequency.

Preferably, the steps of detecting the output electrical power from the electromechanical device; and adjusting the damping coefficient of the electromechanical device in response to the detected output electrical power are periodically repeated continually to control the damping coefficient.

More preferably, the frequency is also periodically changed.

More preferably, the frequency is periodically changed to accommodate any changes in ambient frequency of vibration of the electromechanical generator.

Preferably, the electromechanical device is adapted to convert mechanical power to electrical power via an electromagnetic coupling or via a piezoelectric coupling.

The present invention yet further provides a method of converting mechanical vibrational energy into electrical energy using an electromechanical generator, the method comprising the steps of: providing an electromechanical device comprising a velocity damped resonator having a damping coefficient and a resonant frequency; presetting the damping coefficient to a preset first damping coefficient; presetting the resonant frequency to a preset first frequency; vibrating the electromechanical device; detecting the output electrical power from the electromechanical device; changing the resonant frequency of the electromechanical device from the preset first frequency until a maximum output electrical power is detected at the preset first damping coefficient, the resonant frequency being changed to a final resonant frequency; and reducing, at the final resonant frequency, the damping coefficient of the electromechanical device from the preset first damping coefficient until a maximum output electrical power is detected at the final resonant frequency.

Typically, the final resonant frequency is higher than the preset first frequency, but it may be lower in some applications.

Preferably, the steps of detecting the output electrical power from the electromechanical device; changing the resonant frequency of the electromechanical device from the preset first frequency until a maximum output electrical power is detected at the preset first damping coefficient, the resonant frequency being changed to a final resonant frequency; and reducing, at the final resonant frequency, the damping coefficient of the electromechanical device from the preset first damping coefficient until a maximum output electrical power is detected at the final resonant frequency are periodically repeated continually to control the damping coefficient and the resonant frequency.

More preferably, the frequency is periodically changed to accommodate any changes in ambient frequency of vibration of the electromechanical generator.

BRIEF DESCRIPTION OF THE DRAWINGS

Embodiments of the present invention will now be described by way of example only with reference to the accompanying drawings, in which.

DETAILED DESCRIPTION OF THE INVENTION

Figure 1:
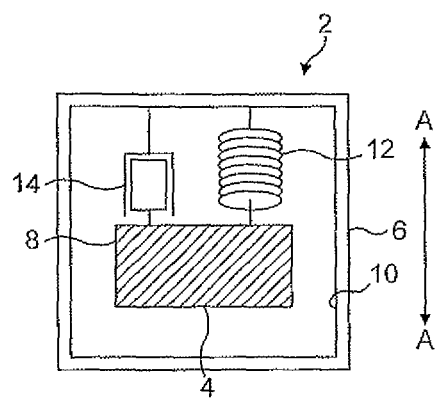
FIG. 1 is a schematic side elevation of an electromechanical device for converting mechanical vibrational energy into electrical energy for use in an electromechanical generator in accordance with an embodiment of the present invention.

FIG. 1 shows an electromechanical device 2 for converting mechanical vibrational energy into electrical energy for use in accordance with an embodiment of the present invention. The electromechanical device 2 uses a resonant mass-spring arrangement 4 mounted within an enclosure 6. The resonant mass-spring arrangement 4 comprises an inertial mass 8 mounted to an internal wall 10 of the enclosure 6 by a spring 12 and a damper 14, the spring 12 and damper 14 being in a parallel configuration.

If the enclosure 6 is subject to a source of external vibration that causes it to move along the direction A-A, then the inertial mass 8 may move relative to the enclosure 6, also along the direction A-A. In doing so, the length of the spring 12 is changed, either being compressed or extended, and work is done against the damper 14.

In FIG. 1, for simplicity the damper 14 is shown schematically as a piston and cylinder arrangement. However, as known to persons skilled in the art, the damper 14 comprises an assembly capable of generating an electrical current when the two parts thereof are subjected to relative movement. The mechanical power may be converted to electrical power via an electromagnetic coupling or via a piezoelectric coupling. Typically, the "piston" which as arranged to be translationally movable comprises an electrical coil and the "cylinder" which is arranged to be static comprises a magnetic assembly that generates a region of magnetic flux within which the electrical coil is disposed. However, an opposite configuration may be employed. Movement of the electrical coil within the magnetic flux causes an electrical current to be induced in the electrical coil which can be used as a source of electrical power for driving an external device (not shown).

The present invention utilizes electromechanical devices which are resonant generators known in the art as "velocity-damped" where all of the work done by the movement of the inertial mass 8 relative to the enclosure 6 is proportional to the instantaneous velocity of that movement. Inevitably, a portion of that work is absorbed overcoming unwanted mechanical or electrical losses, but the remainder of the work may be used to generate an electrical current via a suitable transduction mechanism, such as the electrical coil/magnetic assembly described above. The dynamic optimization of the mass-spring and transduction mechanisms to optimally generate electrical power is one purpose of the present invention.

Velocity-damped resonant generators have a well known characteristic response when excited by mechanical vibration in the direction A-A. The amplitude, $Z_0$, of the relative motion of the mass, m, with respect to the enclosure is a function of the angular frequency f, and the amplitude, $Y_0$, of a sinusoidal vibratory motion; and the spring constant k, and damping coefficient c:

$$Z_0 = \frac{f^2}{\sqrt{\left(\frac{k}{m} - f^2\right)^2 + \left(\frac{cf}{m}\right)^2}} Y_0 \quad (1)$$

The power dissipated in the damper may be shown to be:

$$P = \frac{1}{2} f^2 c Z_0^2 \quad (2)$$

Substituting (1) into (2) gives:

$$P = \frac{\frac{1}{2} f^6 c}{\left(\frac{k}{m} - f^2\right)^2 + \left(\frac{cf}{m}\right)^2} Y_0^2 \quad (3)$$

Therefore, the power dissipated in the damper, and accordingly the electrical power that can be potentially harvested as a result of the mechanical vibration, depends on, inter alia, the damping coefficient and the frequency of vibration.

Figure 2:
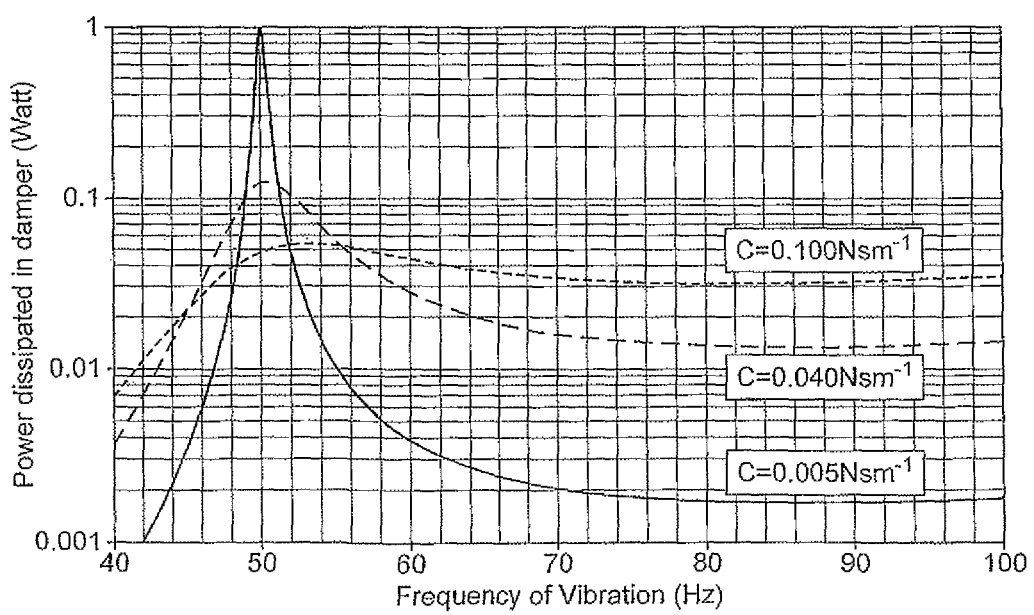
FIG. 2 is graph showing the relationship between power output and frequency for a series of three different damping coefficients for the electromechanical device of FIG. 1.

FIG. 2 shows a plot of an example of the relationship between the power dissipated in a damper and frequency at three different damping coefficients; c=0.005 Nsm$^{-1}$, c=0.04 Nsm$^{-1}$ and c=0.1 Nsm$^{-1}$. In this example the mass-spring system has been designed to operate at resonant frequency (f) in the region of 50 Hz by using a mass (m) of 1 gram and a spring constant (k) of 98.7 Nm$^{-1}$. The vibration amplitude ($Y_0$) is 1 mm.

FIG. 2 clearly shows that the power dissipated (and hence the power available for extraction) is optimized with a different selection of the damping coefficient depending upon the vibration frequency. A more complex analysis shows this still to be the case if the parasitic damping caused by mechanical drag, etc. is taken into account. FIG. 2 shows that at a relatively low damping coefficient (c=0.005 Nsm$^{-1}$) the maximum power output is high and that as the damping coefficient is increased (to c=0.04 Nsm$^{-1}$ and then to c=0.1 Nsm$^{-1}$) the maximum power output is progressively decreased. However, as the maximum power output increases, the peak of the vibration power spectrum becomes progressively narrower.

In most practical situations a vibration energy-harvesting device is required to extract as much power from its environment as possible. FIG. 2 shows that this can only be achieved with prior knowledge of the vibration power spectrum. Therefore, in the prior art it has been known to design an electromechanical generator so as theoretically to obtain maximum power output by tuning the damping factor by minimizing it (assuming the other parameters are constant). There are two problems with this known technical approach. First, often it will be found that the vibration power spectrum will in fact vary over time. This may be due to many reasons which include a change in a load driven by the source of the vibration or a change in structure stiffness due to material aging or fatigue. Hence it is not always possible to have enough prior knowledge of the vibration in order to optimize the power extraction over a useful design lifetime. Second, when used in a practical application the actual vibration conditions, in particular the frequency, may not correspond to the theoretical conditions employed to select the damping coefficient. As FIG. 2 shows, at high power output the vibration power spectrum becomes progressively narrower, and therefore more sensitive to variations in useful power output with frequency.

The present invention is predicated on the recognition by the inventors that if the resonant frequency of the device is fixed, then variable damping may be used to optimize power. FIG. 2 shows that if the resonant frequency were adjustable, then power would be optimized by shifting the resonant frequency of the device to coincide with the peak of the vibration power spectrum. In particular, the inventors have recognized that in order to optimize the power extracted when insufficient prior knowledge is available on the operating conditions of the vibration energy-harvesting device, it should be possible to be able dynamically to change the response of the device. Accordingly, an ability to tune the device in damping coefficient, and preferably modify the resonant frequency, is all that is required to optimize the power output. In addition, if the frequency of ambient vibration changes during the operational lifetime of the electromagnetic generator, the response of the device can be changed to accommodate the frequency change, and thereby the electromagnetic generator would be able to operate at maximum efficiency despite the frequency change.

Figure 3:
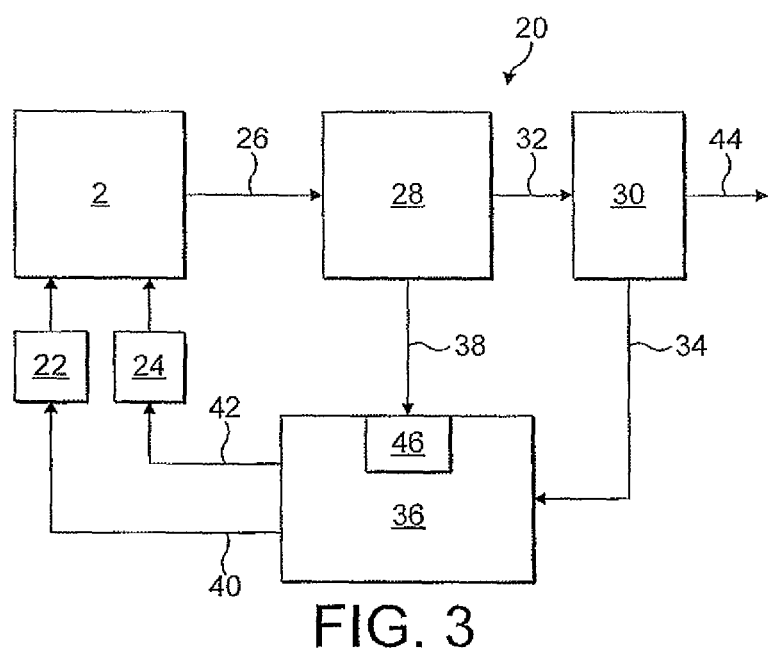
FIG. 3 is a schematic block diagram of an electromechanical generator in accordance with a first embodiment of the present invention, which incorporates the electromechanical device of FIG. 1.

FIG. 3 is a schematic block diagram of an electromechanical generator 20 in accordance with a first embodiment of the present invention.

The electromechanical generator 20 comprises the electromechanical device 2 for converting mechanical vibrational energy into electrical energy as described above with reference to FIG. 1. However, a damping coefficient adjuster 22 and a resonant frequency adjuster 24 are additionally provided. The structure and operation of such a damping coefficient adjuster 22 and such a resonant frequency adjuster 24 will be apparent to those skilled in the art (see for example the paper entitled "Architecture for vibration-driven micropower generators", by Mitcheson et al, discussed above). The damping coefficient is changed by altering the load impedance connected to the resonator device. For example the damping coefficient may be adjusted by varying the current permitted to flow through the coil, e.g. by varying the electrical resistance of the circuit containing the coil. The resonant frequency is changed by altering the resonator. The resonant frequency may be adjusted by varying the vibrational characteristics of the spring (for example using a piezoelectric element affixed thereto thereby to vary the spring constant k, by resistive heating or by changing the cross-section of the spring by applying a force). The resonant frequency may alternatively be adjusted by varying the inertial mass, for example by changed by altering the dimensions of the resonator or by changing an applied reactive load. In the illustrated embodiment, the resonant frequency adjuster 24 is adapted to vary the spring constant k.

The damping coefficient adjuster 22 is adapted to be able to store a preset or default value of a damping coefficient c. Correspondingly, the resonant frequency adjuster 24 is adapted to be able to store a preset or default value of a spring constant k, corresponding to a low resonant frequency. The damping coefficient adjuster 22 and the resonant frequency adjuster 24 are adapted to be able to use the preset or default value as a starting value for the respective parameter on initial start up of the electromechanical generator when it is subjected to vibration. Correspondingly, when the vibration stops, and no power is generated, the default value is stored and thereafter used again as a starting value in a subsequent power generation cycle when vibration commences again.

The default value of the frequency depends on the particular electromechanical generator and its application. Typically, the default frequency value may be 50 Hz or 60 hz, for example. This is because many devices vibrate at a frequency near to the frequency of mains AC power (50 or 60 Hz).

Figure 4:
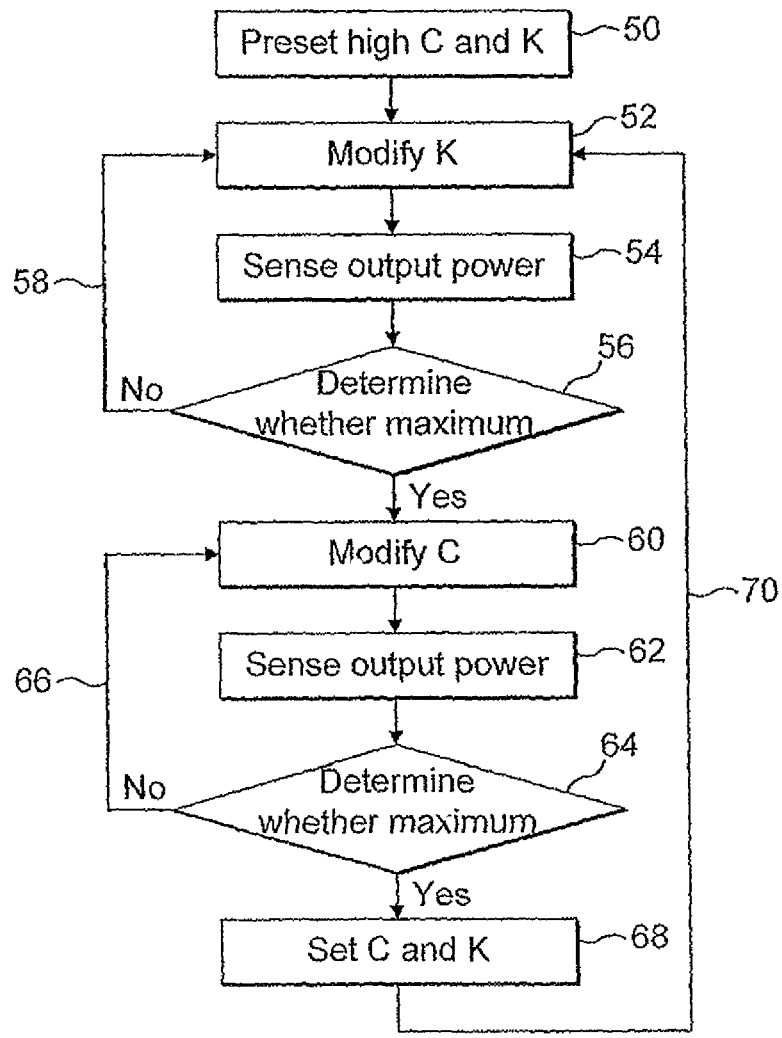
FIG. 4 is a schematic flow diagram showing an embodiment of the method of operating the electromechanical generator of FIG. 3.
Figure 5:
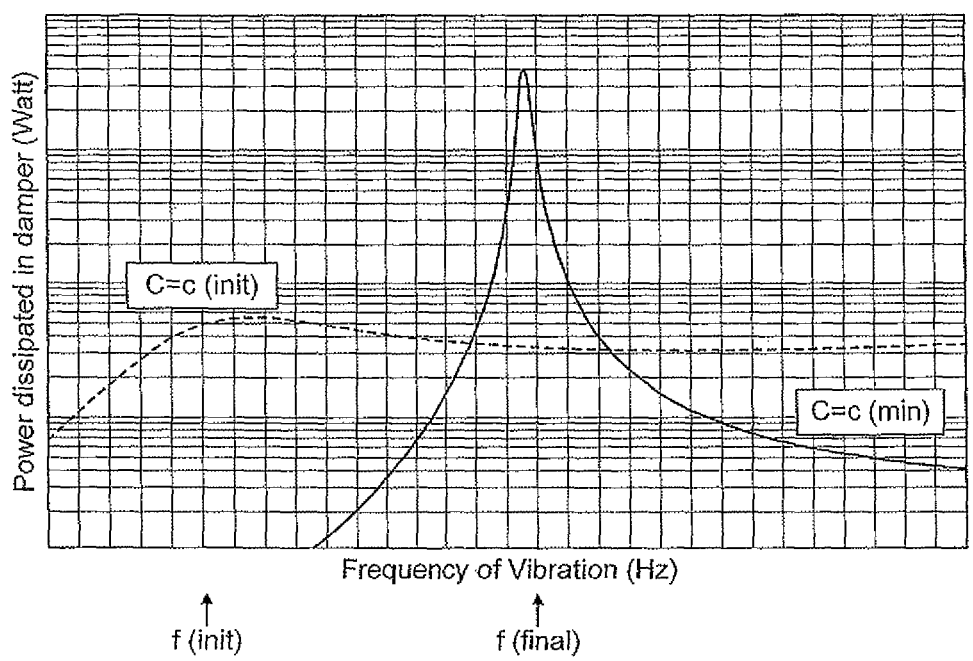
FIG. 5 is graph showing the relationship between power output and frequency for a series of two different damping coefficients for the electromechanical generator of FIG. 3.

The electromechanical device 2 has a power output line 26 connected to a power circuit 28. The power output line 26 outputs any electrical current generated by the electromechanical device 2, and for example is connected to a coil arranged to be moved by the mechanical vibrational motion within the magnetic flux created by a magnet assembly. The power circuit 28 is connected to a power sensor 30 on a power output line 32 (or alternatively has an integral power sensor). The power sensor 30 is connected by a power sensing signal line 34 to a microprocessor controller 36. A power line 38 connects the power circuit 28 to the microprocessor controller 36 to provide sufficient electrical power to drive the microprocessor controller 36. The microprocessor controller 36 has two output control lines, a first control line 40 connected to the damping coefficient adjuster 22 for controlling the damping coefficient and a second control line 42 connected to the resonant frequency adjuster 24 for controlling the resonant frequency. An output line 44 from the power sensor 30 provides electrical power to drive an external device (not shown). The microprocessor controller 36 includes a comparator 46 to determine whether the output power on power sensing signal line 34 is at a maximum One preferred method of the operation of the electromechanical generator of FIG. 3 is now described with reference to FIG. 4 which shows a schematic flow diagram showing an embodiment of the method of operating the electromechanical generator of FIG. 3 and FIG. 5 which shows the relationship between power output and frequency for a series of two different damping coefficients for the electromechanical generator of FIG. 3.

Initially, the damping coefficient adjuster 22 is preset in step 50 to a default value of a high damping coefficient c. The default value c (init.) is preset so as to be sufficient, in conjunction with the remaining parameters of the device, to permit the output power to drive the control circuitry of the electromechanical generator, in particular the microprocessor controller 36, yet insufficient to permit the output power to be optimized or even a useful output power harvested from the mechanical vibration for driving an external device (not shown). Also, initially, the resonant frequency adjuster 24 is preset in step 50 to a default value of a low spring constant k, corresponding to a low resonant frequency. The default value k (init.) is preset so that the default frequency f (init.) is remote from the design resonant frequency of the device, and preferably lower than the design resonant frequency. Again, the default value of the spring constant is selected to permit the output power at that default value to be sufficient to drive the control circuitry of the electromechanical generator, in particular the microprocessor controller 36, yet insufficient to permit the output power to be optimized or even a useful output power harvested from the mechanical vibration for driving an external device (not shown). For example, referring to FIG. 5, the default damping coefficient value c (init.) and the default frequency f (init.), corresponding to the default spring constant value k (init.), are initially preset.

Therefore, the damping coefficient is at its highest value and the resonant frequency is at its lowest value either when no control power is applied by the power circuit 28 to drive the microprocessor controller 36 or when the microprocessor controller 36 is first driven into operation by the harvested power on power line 38 for the microprocessor controller 36.

After vibration has commenced, and the electrical current generated by the electromechanical device 2 provides sufficient electrical power to drive the microprocessor controller 36, the microprocessor controller 36 operates to modify the electromechanical device 2 so as to maximize the output power on line 44.

The resonant frequency adjuster 24 is adjusted in step 52 to modify the frequency by varying the spring constant k. The output power is sensed by the power sensor 30 in step 54. A comparison step 56 is made by comparator 46 to determine whether the output power is at a maximum. If not, a feedback control loop 58 is performed so that the frequency is progressively adjusted so as to achieve, at a frequency f (final), maximum output power at the default value c (init.) of the damping coefficient (see FIG. 5).

If yes, then the damping coefficient adjuster 22 is adjusted in step 60. The output power is sensed by the power sensor 30 in step 62. A comparison step 64 is made by comparator 46 to determine whether the output power is at a maximum. If not, a feedback control loop 66 is performed so that the damping coefficient is progressively adjusted, i.e. reduced, so as to achieve maximum output power at the frequency ω (final), of the damping coefficient. If yes, the damping coefficient and spring constant are set in step 68. This achieves the peak maximum output power at a frequency f (final) and at a damping coefficient c (min.) both different from the initial preset values.

Finally, the peak maximum output power is maintained over time during the operational lifetime of the electromechanical generator using a feedback control loop 68 which periodically determines whether the maximum output power is being generated and adjusts, if necessary one or both of the frequency f, by varying the spring constant k, and the damping factor c.

In the illustrated embodiment the final resonant frequency is higher than the preset first frequency and the frequency is increased in step 52. However, in alternative embodiments the final resonant frequency is lower than the preset first frequency and the frequency is reduced in step 52.

The system may additionally be configured to default to a high damping coefficient and high resonant frequency in the absence of any vibration or significant vibration to generate sufficient power to operate the control circuitry, in particular the microprocessor controller 36. When the required minimum power is generated and detected, the default values of a high damping coefficient c and a low spring constant k (corresponding to low frequency f) may be preset, as shown in step 50.

In alternative methods of operating the electromechanical generator, other routines may be employed to maximize the output power starting from a highly damped initial configuration on commencement of vibration.

Figure 6:
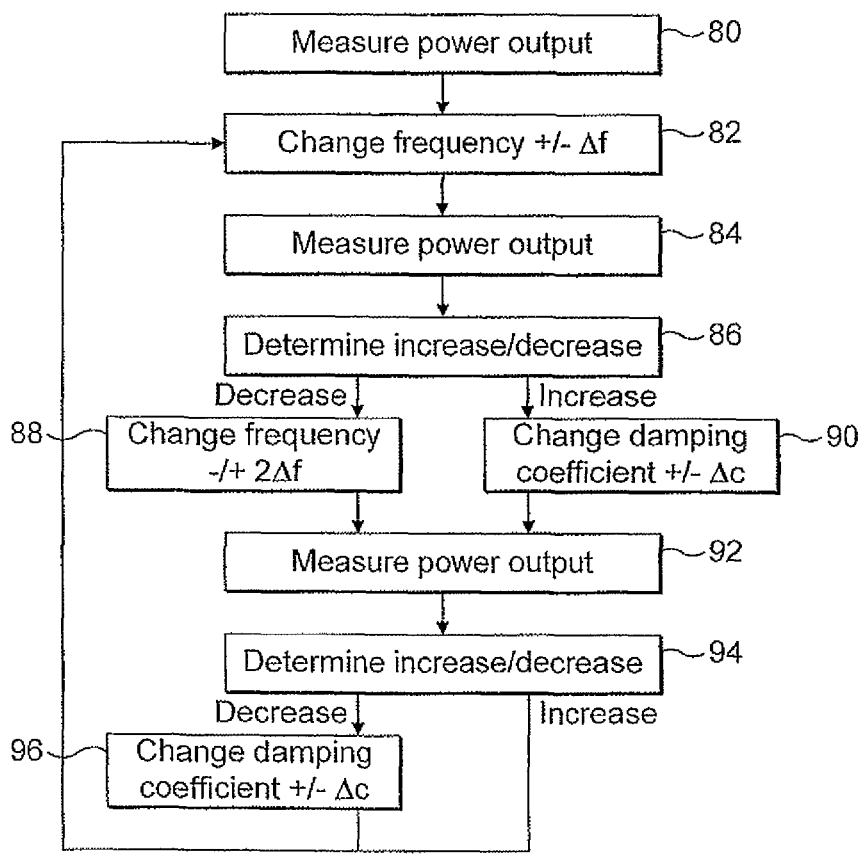
FIG. 6 is a schematic flow diagram showing a further embodiment of the method of operating the electromechanical generator of FIG. 3.

For example, as shown in FIG. 6, on commencement of the control routine after initiation of vibration to generate sufficient electrical power too drive the control circuitry, in a first step 80 the power output is measured. In a second step 82 a small change (increment or decrement) is made to the frequency (e.g. by modifying the spring constant k). In a next step 84, the power output is again measured. In a further step 86, it is determined whether the power output had increased or decreased. If the power output has decreased, a step 88 is performed to change the frequency in the opposite direction to the previous change and at double the amount. If the power output has increased, a small change (increment or decrement) is made to the damping coefficient c in step 90. In a next step 92, the power output is again measured. In a further step 94, it is determined whether the power output had increased or decreased. If the power output has decreased, a step 96 is performed to change the damping coefficient c in the opposite direction to the previous change and at double the amount. The routine then returns to step 82.

This cycle of steps may be repeated periodically and indefinitely to maintain maximum power output at the given vibration conditions at the relevant point in the useful lifetime of the electromechanical generator.

If the frequency of ambient vibration changes during the operational lifetime of the electromagnetic generator, the response of the device can be changed to accommodate the frequency change, and thereby the electromagnetic generator would be able to operate at maximum efficiency despite the frequency change.

Other control routines and algorithms for their operation will be apparent to those skilled in the art for maintaining a maximum power output of the electromechanical generator.

The following Comparative Examples and Example of practical use, referring to FIG. 2, demonstrates the advantages of the use of tunable damping and frequency in accordance with the embodiments of the present invention.

COMPARATIVE EXAMPLE 1

An energy harvesting device not in accordance with the present invention is constructed with a fixed damping coefficient of $c=0.005$ $Nsm^{-1}$, referring to FIG. 2, so as to be able to produce a maximum peak output power. However, the vibration frequency range for achieving the maximum peak output power is very narrow. If the vibration frequency changes over time, or is different in practice from the intended value upon which the design was based, then the output power is significantly reduced, and may even not be a useful output power.

COMPARATIVE EXAMPLE 2

An energy harvesting device not in accordance with the present invention is constructed with a fixed damping coefficient of $c=0.005$ $Nsm^{-1}$, referring to FIG. 2, so as to be able to produce a maximum peak output power and connected to control circuitry. The circuitry is designed in such a way that if the device produces more than 10 mW of electrical power then it can tune the resonant frequency of the device by means of an actuator. In this way the resonance can be aligned with the vibration source and high power output can be achieved. FIG. 2 shows that (ignoring all parasitic losses for sake of clarity) the circuitry will start up if the vibration frequency is between 46.8 Hz and 54.8 Hz. However, if the vibration starts outside of this range, say at 70 Hz, then the device will not operate (making the reasonable assumption that the device has no energy store).

EXAMPLE 1

An energy harvesting device in accordance with the present invention is constructed with a variable damping coefficient and connected to control circuitry. The circuitry is designed in such a way that if the device produces more than 10 mW of electrical power then it can tune the resonant frequency of the device by means of an actuator and can tune the damping coefficient. Initially, the damping coefficient is set at $c=0.1$ $Nsm^{-1}$, permitting an allowable start-up frequency range of from 41.6 Hz and extending to much higher frequencies for producing the required 10 mW output. Nevertheless, once tuned the device would produce relatively low output power. Therefore the damping coefficient can be reduced to $c=0.005$ $Nsm^{-1}$ so as to be able to produce a maximum peak output power with the resonance aligned with the vibration source. Therefore, it is clear that optimum power output can reliably be achieved by utilizing the ability to tune both resonant frequency and damping coefficient. In accordance with the invention, a system with the dual ability to tune both resonant frequency and damping coefficient can be designed such that optimum power output can be achieved under a far wider range of real world operating conditions. Such a system would default to a high damping coefficient and low resonant frequency when the circuit received too little power to operate. When the vibration source resumed, the system would tune the resonant frequency while keeping the damping coefficient high and then reduce the damping coefficient to maximize power after successfully tuning.

The invention claimed is:

1. An electromechanical generator comprising an electromechanical device for converting mechanical vibrational energy into electrical energy, the electromechanical device being a velocity damped resonator having a damping coefficient and a resonant frequency, a power detector for detecting the output electrical power from the electromechanical device, a controller, a damping coefficient adjuster for adjusting the damping coefficient of the electromechanical device, the controller being arranged to control the damping coefficient adjuster in response to the output electrical power detected by the power detector, and a resonant frequency adjuster for adjusting the resonant frequency of the electromechanical device, the controller being arranged to control the resonant frequency adjuster in response to the output electrical power detected by the power detector, wherein the resonant frequency adjuster is adapted to adjust the resonant frequency of the electromechanical device until a maximum power output has been detected by the power detector, the resonant frequency being adjusted to a particular resonant frequency, and wherein the damping coefficient adjuster is adapted to then adjust, at the particular resonant frequency, the damping coefficient of the electromechanical device until a maximum output electrical power is detected at the particular resonant frequency.

2. An electromechanical generator according to claim 1 wherein the damping coefficient adjuster is preset to default to a preset first damping coefficient.

3. An electromechanical generator comprising an electromechanical device for converting mechanical vibrational energy into electrical energy, the electromechanical device being a velocity damped resonator having a damping coefficient and a resonant frequency, a power detector for detecting the output electrical power from the electromechanical device, a controller, and a damping coefficient adjuster for adjusting the damping coefficient of the electromechanical device, the controller being arranged to control the damping coefficient adjuster in response to the output electrical power detected by the power detector, wherein the damping coefficient adjuster is preset to default to a preset first damping coefficient, and wherein the damping coefficient adjuster is one of:
preset to default to the preset first damping coefficient upon detection of output electrical power above a preset threshold value by the power detector;
adapted to reduce the damping coefficient from the preset first damping coefficient under control of the controller after the power detector has detected a maximum power output at a resonant frequency; and
preset to default to a preset second damping coefficient, higher than the first damping coefficient, in the absence of the detection of output electrical power above a preset threshold value by the power detector.

4. An electromechanical generator according to claim 2 wherein the damping coefficient adjuster is adapted to reduce the damping coefficient from the preset first damping coefficient under control of the controller after the power detector has detected a maximum power output at a resonant frequency.

5. An electromechanical generator according to claim 2 wherein the damping coefficient adjuster is preset to default to a preset second damping coefficient, higher than the first damping coefficient, in the absence of the detection of output electrical power above a preset threshold value by the power detector.

6. An electromechanical generator according to claim 1 wherein the resonant frequency adjuster is preset to default to a preset first frequency.

7. An electromechanical generator comprising an electromechanical device for converting mechanical vibrational energy into electrical energy, the electromechanical device being a velocity damped resonator having a damping coefficient and a resonant frequency, a power detector for detecting the output electrical power from the electromechanical device, a controller, and a damping coefficient adjuster for adjusting the damping coefficient of the electromechanical device, the controller being arranged to control the damping coefficient adjuster in response to the output electrical power detected by the power detector, wherein the electromechanical generator further comprises a resonant frequency adjuster for adjusting the resonant frequency of the electromechanical device, the controller being arranged to control the resonant frequency adjuster in response to the output electrical power detected by the power detector, wherein the resonant frequency adjuster is preset to default to a preset first frequency, and wherein the resonant frequency adjuster is one of:
preset to default to the preset first frequency upon detection of output electrical power above a preset threshold value by the power detector;
adapted to change the frequency from the preset first frequency under control of the controller at a particular damping coefficient, the frequency being changed until a maximum power output has been detected by the power detector; and
preset to default to a preset second frequency, different from the first frequency, in the absence of the detection of output electrical power above a preset threshold value by the power detector.

8. An electromechanical generator according to claim 6 wherein the resonant frequency adjuster is adapted to change the frequency from the preset first frequency under control of the controller at a particular damping coefficient, the frequency being changed until a maximum power output has been detected by the power detector.

9. An electromechanical generator according to claim 6 wherein the resonant frequency adjuster is preset to default to a preset second frequency, different from the first frequency, in the absence of the detection of output electrical power above a preset threshold value by the power detector.

10. An electromechanical generator according to claim 1 wherein the resonator of the electromechanical device has a spring constant and the resonant frequency adjuster is adapted to control the resonant frequency by adjusting the spring constant.

11. An electromechanical generator according to claim 1 further comprising a power circuit, driven by the output electrical power, for driving the controller.

12. An electromechanical generator according to claim 1 further comprising a comparator in the controller for determining the maximum output power from the electromechanical device.

13. An electromechanical generator according to claim 1 wherein the controller is adapted periodically to control the damping coefficient adjuster.

14. An electromechanical generator according to claim 13 further comprising a resonant frequency adjuster for adjusting the resonant frequency of the electromechanical device, the controller being arranged to control the resonant frequency adjuster in response to the output electrical power detected by the power detector, and wherein the controller is adapted periodically to control the resonant frequency adjuster.

15. An electromechanical generator according to claim 14 wherein the controller is adapted periodically to control the resonant frequency adjuster to accommodate any changes in ambient frequency of vibration of the electromechanical generator.

16. An electromechanical generator according to claim 1 wherein the electromechanical device is adapted to convert mechanical power to electrical power via an electromagnetic coupling.

17. An electromechanical generator according to claim 1 wherein the electromechanical device is adapted to convert mechanical power to electrical power via a piezoelectric coupling.

18. A method of converting mechanical vibrational energy into electrical energy using an electromechanical generator, the method comprising the steps of:
providing an electromechanical device comprising a velocity damped resonator having a damping coefficient and a resonant frequency;
vibrating the electromechanical device;
detecting the output electrical power from the electromechanical device;
adjusting the resonant frequency of the electromechanical device in response to the detected output electrical power; and
adjusting the damping coefficient of the electromechanical device in response to the detected output electrical power,
wherein the adjusting the resonant frequency comprises adjusting the resonant frequency until a maximum power output has been detected, the resonant frequency being adjusted to a particular resonant frequency, and
wherein the adjusting the damping coefficient comprises then adjusting the damping coefficient, at the particular resonant frequency, until a maximum output electrical power is detected at the particular resonant frequency.

19. A method according to claim 18 further comprising the step of presetting the damping coefficient to a preset first damping coefficient.

20. A method of converting mechanical vibrational energy into electrical energy using an electromechanical generator, the method comprising the steps of:
providing an electromechanical device comprising a velocity damped resonator having a damping coefficient and a resonant frequency;
vibrating the electromechanical device;
detecting the output electrical power from the electromechanical device; and
adjusting the damping coefficient of the electromechanical device in response to the detected output electrical power;
wherein the method further comprises the step of presetting the damping coefficient to a preset first damping coefficient; and
wherein the method further comprises the step of one of:
presetting the damping coefficient to the preset first damping coefficient upon detection of output electrical power above a preset threshold value,
reducing the damping coefficient from the preset first damping coefficient after detection of a maximum power output at a resonant frequency; and
presetting the damping coefficient to preset second damping coefficient, higher than the first damping coefficient, in the absence of the detection of output electrical power above a preset threshold value.

21. A method according to claim 19 further comprising the step of reducing the damping coefficient from the preset first damping coefficient after detection of a maximum power output at a resonant frequency.

22. A method according to claim 19 further comprising the step of presetting the damping coefficient to preset second damping coefficient, higher than the first damping coefficient, in the absence of the detection of output electrical power above a preset threshold value.

23. A method of converting mechanical vibrational energy into electrical energy using an electromechanical generator, the method comprising the steps of:
providing an electromechanical device comprising a velocity damped resonator having a damping coefficient and a resonant frequency;
presetting the damping coefficient to a preset first damping coefficient;
presetting the resonant frequency to a preset first frequency;
vibrating the electromechanical device;
detecting the output electrical power from the electromechanical device;
changing the resonant frequency of the electromechanical device from the preset first frequency until a maximum output electrical power is detected at the preset first damping coefficient, the resonant frequency being changed to a final resonant frequency; and
reducing, at the final resonant frequency, the damping coefficient of the electromechanical device from the preset first damping coefficient until a maximum output electrical power is detected at the final resonant frequency.

* * * * *